United States Patent
Bofill

(10) Patent No.: US 9,050,691 B2
(45) Date of Patent: Jun. 9, 2015

(54) SLEEVE AND ROD SUPPORT FOR FUEL BLADDER

(75) Inventor: Steven Bofill, New Haven, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 53 days.

(21) Appl. No.: 13/401,208

(22) Filed: Feb. 21, 2012

(65) Prior Publication Data

US 2013/0214095 A1      Aug. 22, 2013

(51) Int. Cl.
```
B64D 37/02      (2006.01)
B23P 11/00      (2006.01)
B64D 37/04      (2006.01)
B64D 37/06      (2006.01)
```

(52) U.S. Cl.
CPC ............ *B23P 11/00* (2013.01); *Y10T 29/49947* (2015.01); *B64D 37/04* (2013.01); *B64D 37/06* (2013.01)

(58) Field of Classification Search
USPC .......................................... 244/135 R, 135 B
See application file for complete search history.

(56) References Cited

U.S. PATENT DOCUMENTS

| | | | |
|---|---|---|---|
| 2,361,743 A * | 10/1944 | Butler | 220/9.3 |
| 2,373,221 A * | 4/1945 | Blaylock et al. | 220/4.15 |
| 3,782,588 A | 1/1974 | Allen | |
| 3,843,078 A * | 10/1974 | Schon et al. | 244/135 B |
| 4,214,721 A | 7/1980 | Burhans, Jr. et al. | |
| 4,640,328 A | 2/1987 | Arney | |
| 4,948,070 A | 8/1990 | Lyman | |
| 5,071,003 A | 12/1991 | Freelander | |
| 5,845,879 A * | 12/1998 | Jensen | 244/135 R |
| 6,019,316 A * | 2/2000 | Sarlin et al. | 244/135 R |
| 6,149,102 A * | 11/2000 | Marasco et al. | 244/135 R |
| 7,682,214 B2 * | 3/2010 | Barniak, Jr. | 446/46 |
| 7,861,764 B1 | 1/2011 | Cowan | |
| 2004/0244249 A1 | 12/2004 | Zheng | |

\* cited by examiner

*Primary Examiner* — Brian M O'Hara
*Assistant Examiner* — Keith L Dixon
(74) *Attorney, Agent, or Firm* — Cantor Colburn LLP

(57) ABSTRACT

A flexible fuel bladder structure for an aircraft includes one or more sleeves extending along an exterior of the fuel bladder. The one or more sleeves are receptive of one or more rods to at least partially suspend the fuel bladder in the aircraft. An aircraft includes a fuselage and a flexible fuel bladder disposed in the fuselage. One or more rods are installed through a portion of the fuel bladder and into a fuselage member. The flexible fuel bladder is at least partially suspended from the one or more rods. A method of installing a fuel bladder in an aircraft includes inserting a flexible bladder into a fuselage space of the aircraft. One or more rods are installed through one or more fuselage members and one or more sleeves of the fuel bladder. The one or more rods at least partially suspend the fuel bladder in the fuselage.

17 Claims, 7 Drawing Sheets

SLEEVE AND ROD SUPPORT FOR FUEL BLADDER

BACKGROUND OF THE INVENTION

The subject matter disclosed herein relates to aircraft. More specifically, the subject disclosure relates to fuel bladder structures for aircraft.

Aircraft, such as airplanes, helicopters, turbo props and tilt rotor aircraft typically often include one or more flexible containers, or bladders, for storage of fuel on board the aircraft. The bladder provides a sealed volume for the storage of fuel as an alternative to forming a sealed chamber in the aircraft structure. Mounting the bladder in such a chamber is typically difficult and costly. The bladders include fittings and/or connections for filling the bladder with fuel, outputting the fuel to an aircraft engine, and may also include ancillary components such as fuel pumps and fuel filters and vent fittings.

In a typical aircraft, most often a helicopter, the bladders are contained in sponsons, or projections from the fuselage of the aircraft. As such, the fuel bladders are contained in a space external to the fuselage and do not negatively impact cargo or passenger space in the aircraft. Further, the external location allows for easy access for installation and mounting of the fuel bladders into the sponsons.

In some instances, when installing a fuel bladder in the sponson, the bladder is placed in the sponson and secured into position by string. The bladder includes a plurality of eyelets or similar structure at a top of the bladder, and possibly at other locations around the exterior of the bladder. The interior of the sponson includes a plurality of complimentary mounting locations, and one or more strings or other are looped through the eyelets and the complimentary mounting locations of the sponson to secure the fuel bladder into position in the sponson.

In some aircraft, however, sponsons are not present or useable for installation of a fuel bladder. Thus a fuel bladder, if utilized, must be installed internal to the fuselage. In many cases, the location chosen for the bladder is surrounded by significant structure, such as keels, bulkheads, decks, etc., which do not allow access to the top, and sometimes even the sides of the bladder for installation by the typical string and loop method or other existing methods for mounting a bladder.

BRIEF DESCRIPTION OF THE INVENTION

According to one aspect of the invention, a flexible fuel bladder structure for an aircraft includes one or more sleeves extending along an exterior of the fuel bladder. The one or more sleeves are receptive of one or more rods to at least partially suspend the fuel bladder in the aircraft.

According to another aspect of the invention, an aircraft includes a fuselage and a flexible fuel bladder disposed in the fuselage. One or more rods are installed through a portion of the fuel bladder and into a fuselage member. The flexible fuel bladder is at least partially suspended from the one or more rods installed through the portion of the fuel bladder.

According to yet another aspect of the invention, a method of installing a fuel bladder in an aircraft includes inserting a flexible bladder into a fuselage space of the aircraft. One or more rods are installed through one or more fuselage members and one or more sleeves of the fuel bladder. The one or more rods at least partially suspend the fuel bladder in the fuselage.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
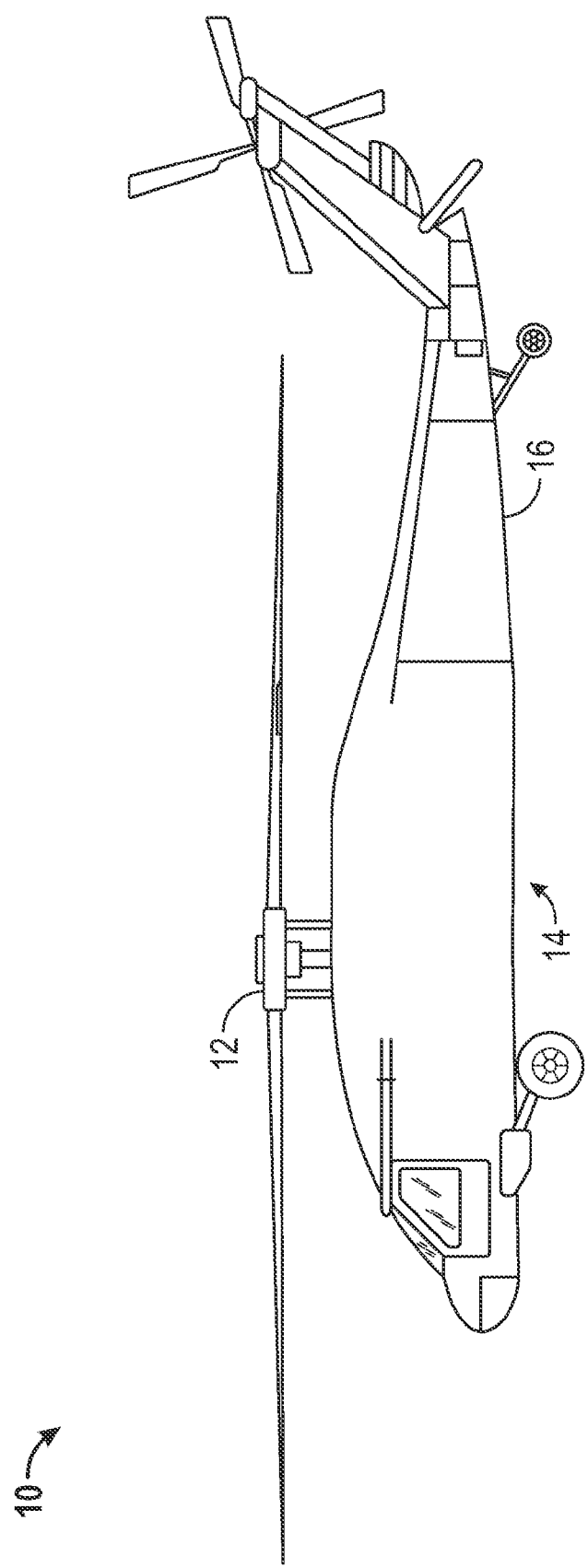
FIG. 1 is a schematic view of an embodiment of a helicopter.

Shown in FIG. 1 is a schematic of a rotary wing aircraft, in this embodiment, a helicopter 10. The helicopter 10 includes a main rotor assembly 12, and a fuselage 14 having an extending tail 16.

Figure 2:
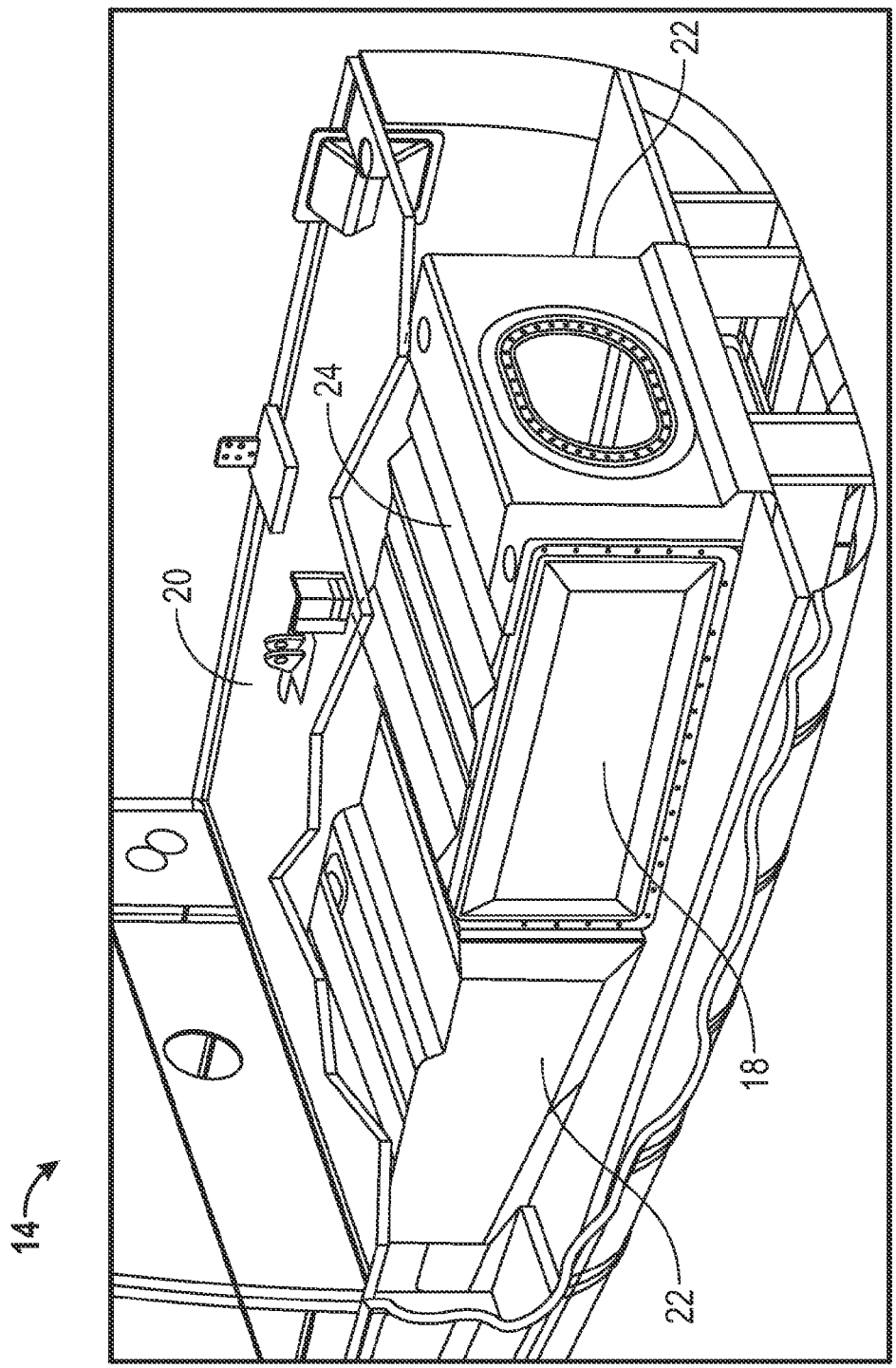
FIG. 2 is a perspective view of an embodiment of a flexible fuel bladder installed deep within the structure of an aircraft.
Figure 3:
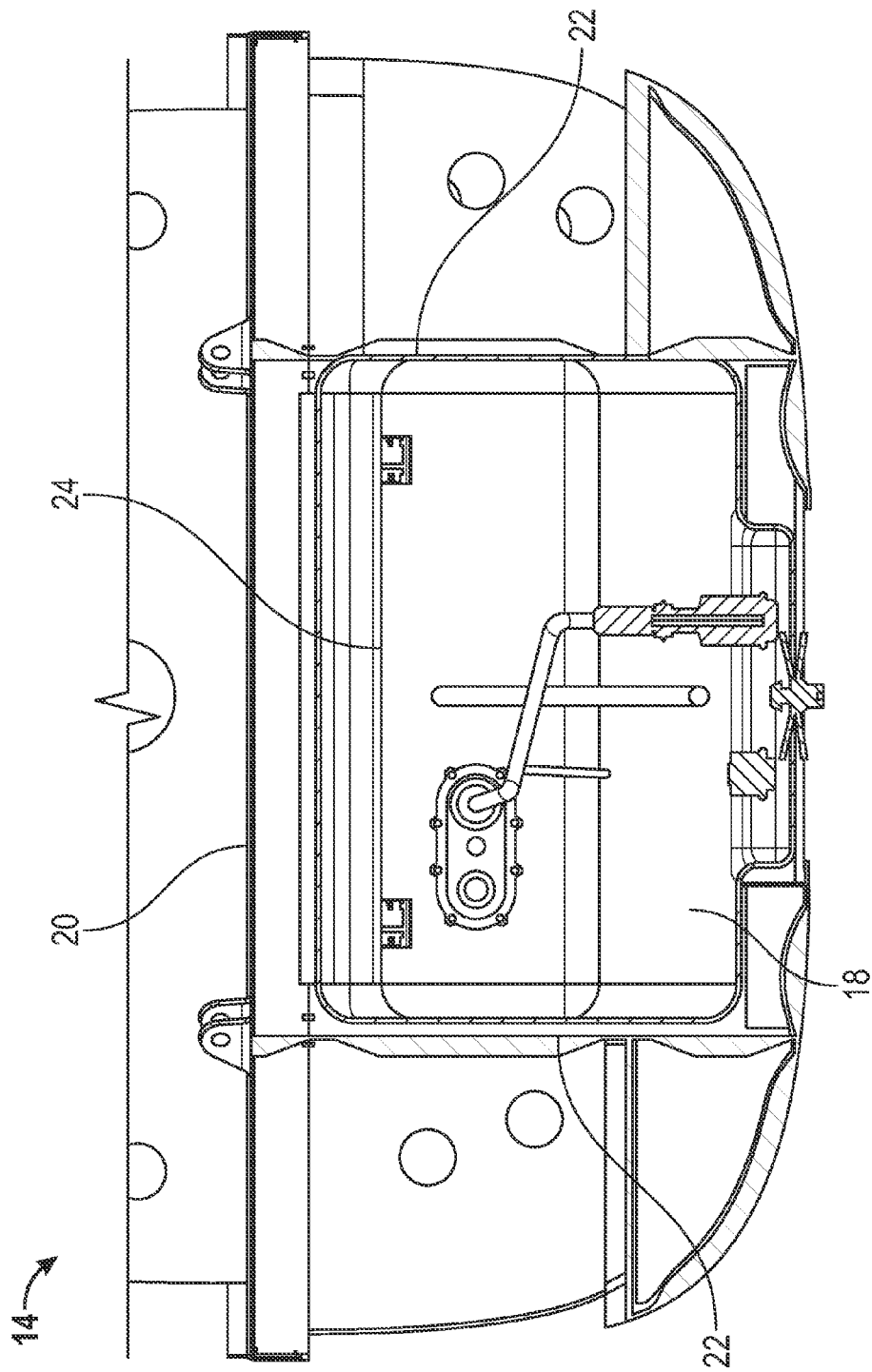
FIG. 3 is an end view of an embodiment of a flexible fuel bladder installed in an aircraft.

Referring to FIGS. 2 and 3, a flexible fuel bladder 18 is located in the fuselage 14. The bladder 18 is positioned in the fuselage 14 below a deck, for example, a transmission deck 20 and between two keels 22, which in some embodiments extend substantially perpendicular to the transmission deck 20. The bladder 18 includes a top portion 24 closest to the transmission deck 20.

Figure 4:
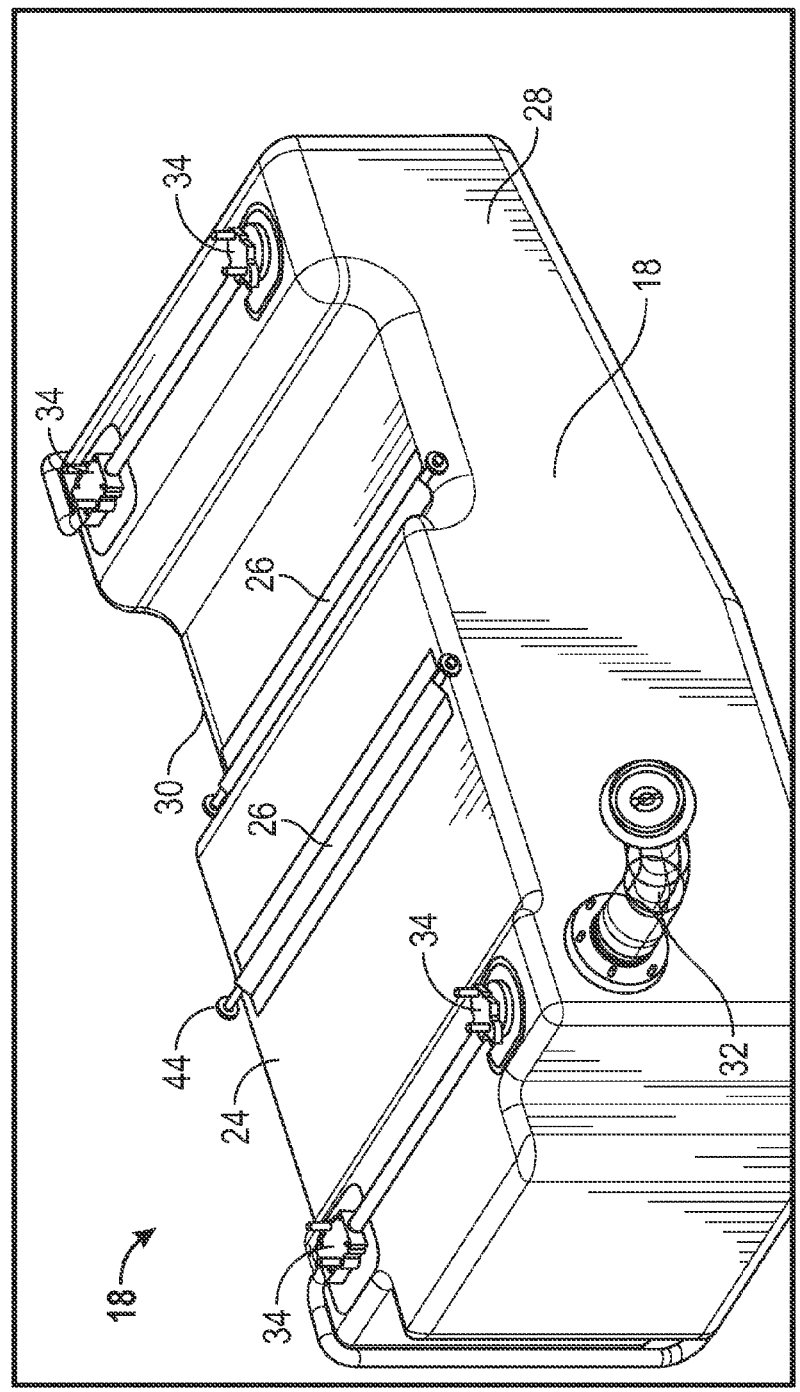
FIG. 4 is a perspective view of an embodiment of a flexible fuel bladder for an aircraft.

Referring to FIG. 4, the bladder 18 includes a securing structure at the top portion 24 to secure the bladder 18 in the fuselage 14. The securing structure includes one or more sleeves 26, in some embodiments formed substantially integrally with the bladder 18, at a top portion 24 of the bladder 18. The sleeves 26 extend from a first side 28 of the bladder 18 to a second side 30 of the bladder 18 between the two keels 22. The sleeves 26 may be formed of the same material as the bladder 18, or formed of a different material. In some embodiments, the sleeves 26 are affixed to the bladder by, for example, an adhesive material. While two sleeves 26 are shown in FIG. 4, it is to be appreciated that other numbers of sleeves 26, for example 3 or 5 sleeves 26, may be utilized depending on the bladder 18 size and/or shape. In some embodiments, as shown in FIG. 4, the bladder 18 includes an integral filler pipe 32, and/or other components such as vent fittings 34, located near corners 36 of the bladder 18, fuel output lines (not shown), or fuel pumps (not shown).

Figure 5:
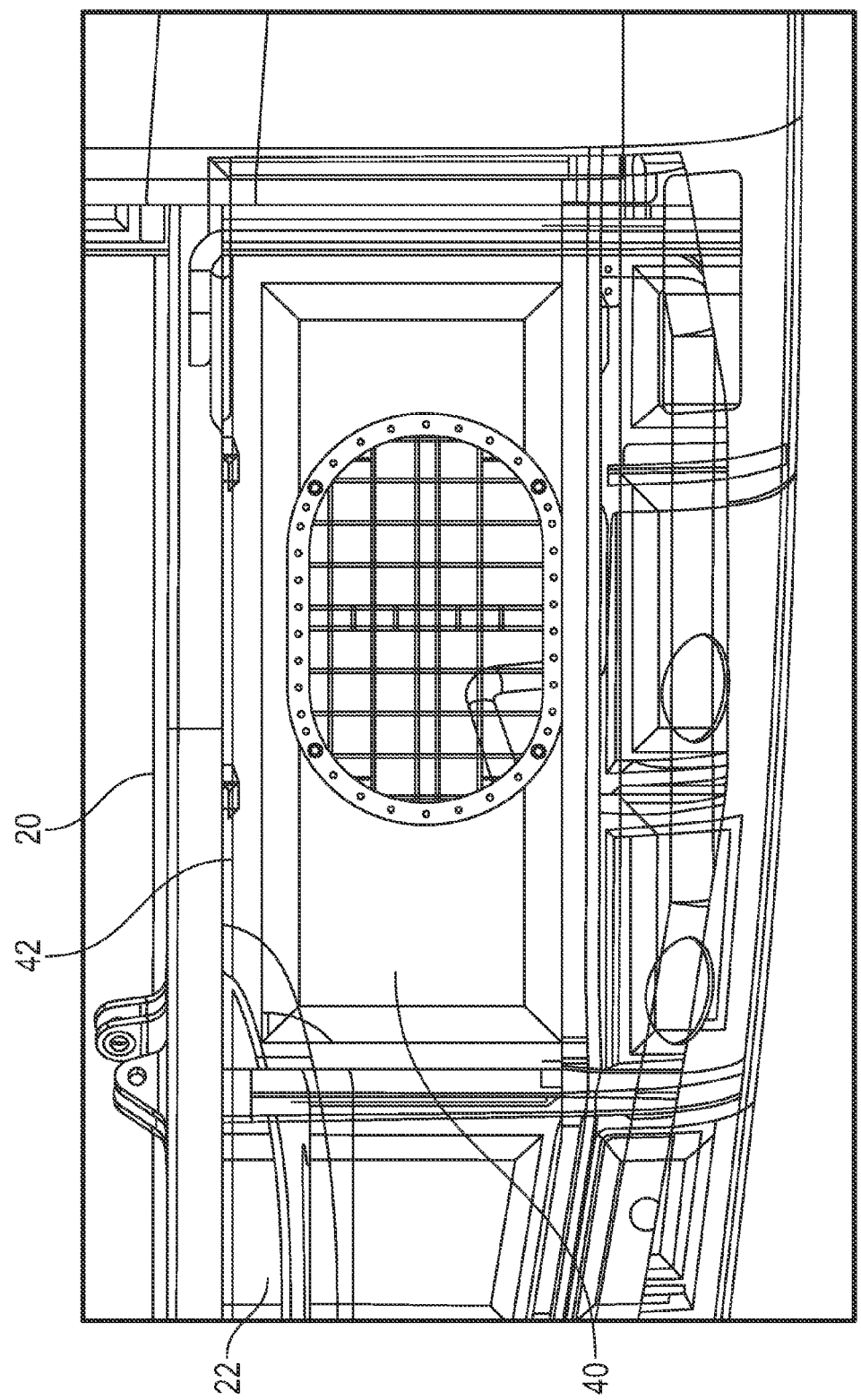
FIG. 5 is a view of an embodiment of a keel structure for an aircraft.

Referring now to FIG. 5, to install the bladder 18 into a fuselage space 38, one or more of the keels 22 includes an access panel 40. The access panel 40 is removable and covers an access opening 42. The flexible bladder 18, is rolled or folded and inserted into the fuselage space 38 through the access opening 42. Once the bladder 18 is in the fuselage space 38, the bladder is unrolled or unfolded to be properly positioned in the fuselage space 38, in some embodiments, by a technician within the fuselage space 38.

Figure 6:
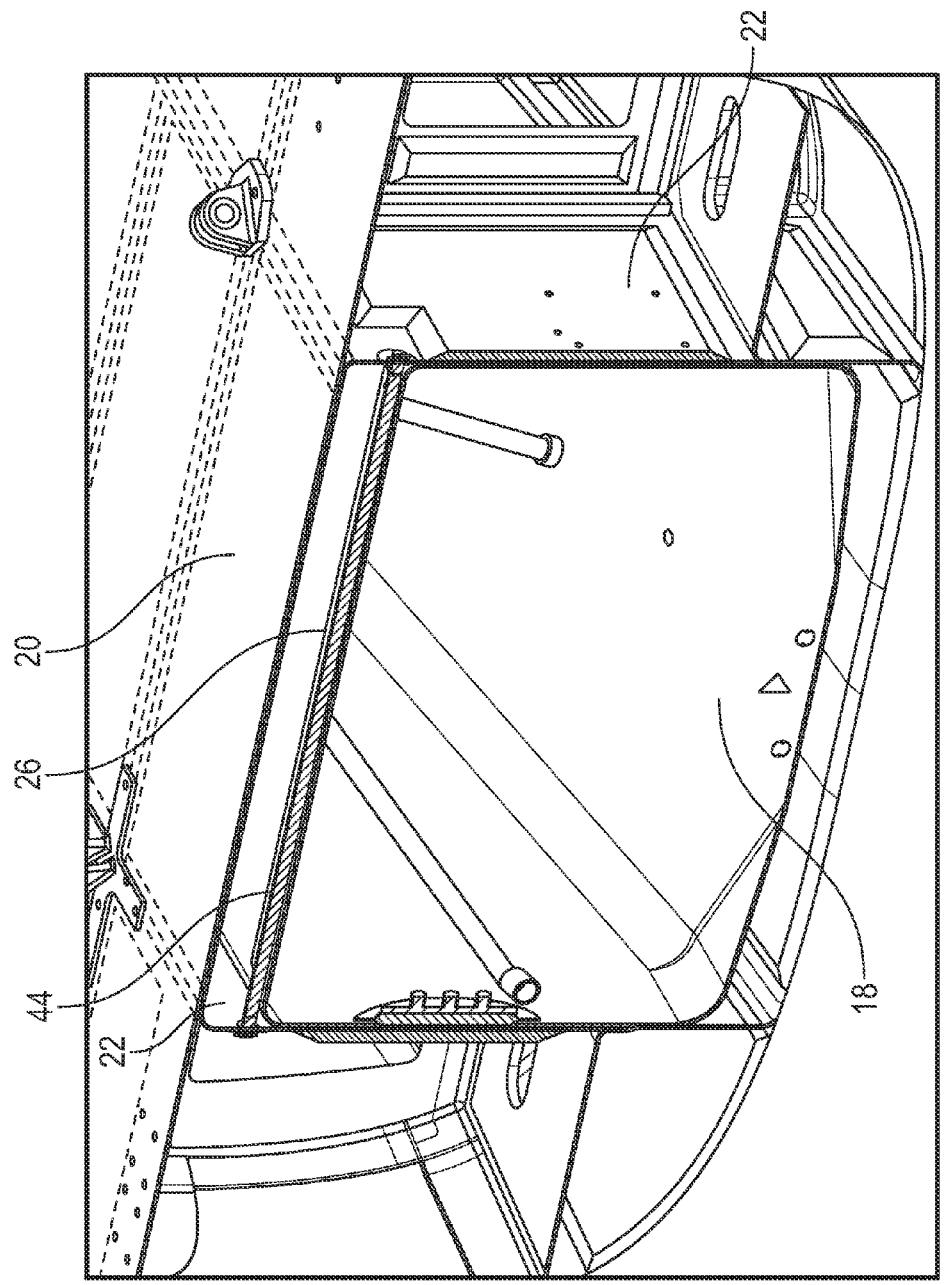
FIG. 6 is a cross-sectional view of a rod installed through a sleeve of a flexible fuel bladder.

Referring to FIG. 6, one or more rods 44 are inserted through keel holes 46 in the keels 22 and through the one or more sleeves 26. After being installed in the sleeves 26, ends of the rods 44 protrude from keel holes (not shown) in the opposing keels 22. The rods 44 may be formed from, for example, aluminum, or any suitable material to support the bladder 18 by hanging when loaded with fuel. As shown in FIG. 6, the sleeves 26 are continuous along their length between the keels 22 to prevent snagging of the rods 44 on edges of the sleeves when inserting the rods 44 into the sleeves 26.

Figure 7:
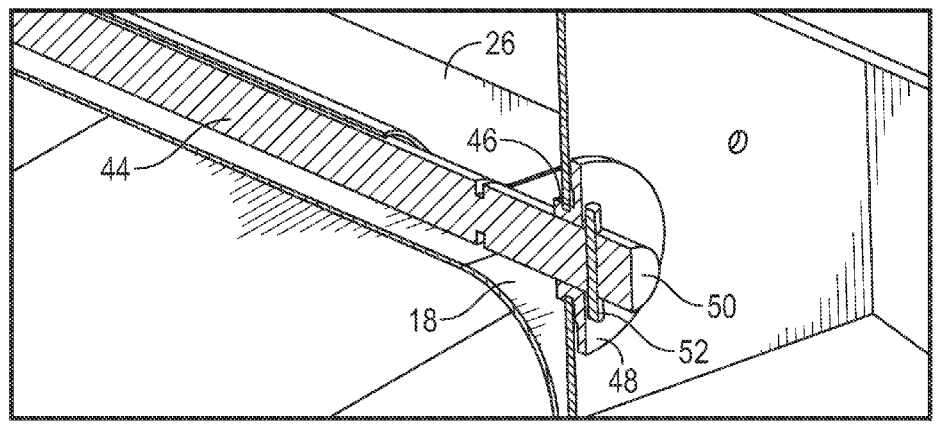
FIG. 7 is a view of a pin and washer structure installed at an end of a rod.

Referring now to FIG. 7, the rods 44 are secured in position to prevent the rods 44 from moving inadvertently and releasing the bladder 18. This may be done in a variety of ways. For example, as shown a gasket and/or a washer 48 is installed over a rod end 50 to cover and/or seal the keel hole 46. A pin 52 is then installed through the rod end 50 to secure the rod 44 in position. This structure is repeated at each rod end 50. Alternatively, other structures may be utilized to secure the rods 44 in position, for example, caps installed over the rod ends 50, or nuts installed over threaded portions of the rod ends 50. With the rods 44 secured in position, the bladder 18 is suspended from and supported by the rods 44 in the fuselage space 38.

Figure 8:
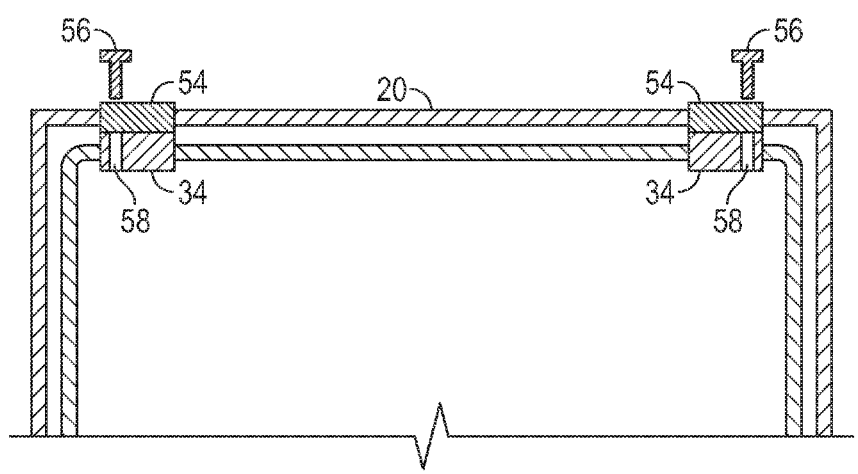
FIG. 8 is a cross-sectional view illustrating vent fitting connection to corresponding deck fittings.

In some embodiments, as shown in FIG. 8, other structures may be used together with the rods 44 to support the bladder 18. The vent fittings 34 located near the corners of the top portion 24 of the bladder 18 are secured to the transmission deck 20 above the top portion 24. The transmission deck 20 is provided with deck fittings 54 above the vent fittings 34. Bolts 56 or other fasteners are inserted through the deck fittings 54 and into threaded holes 58 in the vent fittings 34. When the bolts 56 are tightened, the vent fittings 34, and thus the corners of the bladder 18, are drawn toward the transmission deck 20. The bolts 56 therefore support the corners of the bladder 18.

Utilizing the rods 44 to support the bladder 18 allows the bladder 18 to be installed in fuselage spaces 28 where there is little or no access to the exterior of the bladder 18 for installation, thereby allowing for new and unique placement of the bladders 18 in the aircraft structures where available space is at a premium.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A flexible fuel bladder structure for an aircraft comprising:
   one or more sleeves affixed to and extending along a top exterior surface of the fuel bladder, each sleeve extending continuously from a first lateral side to a second lateral side of the fuel bladder; and
   one or more rods extending through the one or more sleeves along the top exterior surface to at least partially suspend the fuel bladder in the aircraft, the one or more rods extending continuously through the one or more sleeves from the first lateral side to the second lateral side of the fuel bladder.

2. The fuel bladder structure of claim 1, wherein the one or more sleeves are formed integral with the fuel bladder.

3. The fuel bladder structure of claim 1, wherein the fuel bladder includes one or more additional fittings for suspending the fuel bladder in the aircraft.

4. An aircraft comprising:
   a fuselage;
   a flexible fuel bladder disposed in the fuselage; and
   one or more rods installed through a first fuselage member, through a portion of the fuel bladder and into a second fuselage member, the flexible fuel bladder at least partially suspended therefrom, the one or more rods extending continuously from the first lateral side to the second lateral side of the fuel bladder.

5. The aircraft of claim 4, wherein the fuel bladder includes one or more sleeves for installing the one or more rods therethrough.

6. The aircraft of claim 5, wherein the one or more sleeves are formed integral with the fuel bladder.

7. The aircraft of claim 5, wherein the one or more sleeves are disposed at a top portion of the fuel bladder.

8. The aircraft of claim 5, wherein each sleeve of the one or more sleeves extends from a first lateral side to a second lateral side of the fuel bladder.

9. The aircraft of claim 4, wherein the fuselage member is a keel of the fuselage.

10. The aircraft of claim 4, wherein the flexible fuel bladder is suspended beneath a deck of the aircraft.

11. The aircraft of claim 4, wherein the one or more rods are secured in position by one or more of a pin, cap or nut.

12. The aircraft of claim 4, wherein the fuel bladder includes one or more additional fittings for suspending the fuel bladder in the aircraft.

13. The aircraft of claim 12, wherein the one or more additional fittings are one or more vent fittings securable to one or more deck fittings of the fuselage.

14. The aircraft of claim 4, wherein the aircraft is a helicopter.

15. A method of installing a fuel bladder in an aircraft comprising:
   inserting a flexible bladder into a fuselage space of the aircraft; and
   installing one or more rods through a first fuselage member arranged at a first lateral side of the fuel bladder, through one or more sleeves arranged at an upper exterior surface of the fuel bladder and into a second fuselage member arranged at an opposite, second lateral side of the fuel bladder, thereby suspending the fuel bladder in the fuselage.

16. The method of claim 15, further comprising inserting the flexible bladder into the fuselage space through an access opening in a fuselage member of the one or more fuselage members.

17. The method of claim 15, further comprising installing one of a pin, cap, or nut at an end of the one or more rods to secure the one or more rods in position.

\* \* \* \* \*